United States Patent [19]

Lemmey

[11] Patent Number: 4,755,838
[45] Date of Patent: Jul. 5, 1988

[54] CLOSE-UP CAMERA APPARATUS

[76] Inventor: Edgar S. Lemmey, 108 Aspen Dr., Woodbury, N.Y. 11797

[21] Appl. No.: 36,117

[22] Filed: Apr. 9, 1987

[51] Int. Cl.⁴ .................. G03B 15/06; G03B 17/56; G03B 27/54

[52] U.S. Cl. ........................ 354/80; 354/126; 362/16

[58] Field of Search .......... 354/80, 126; 362/16

[56] References Cited

U.S. PATENT DOCUMENTS

| | | | |
|---|---|---|---|
| 3,687,030 | 8/1972 | Dine et al. | 354/293 |
| 3,836,927 | 9/1974 | Dine et al. | 354/80 |
| 4,121,232 | 10/1978 | Jones | 354/126 |
| 4,331,404 | 5/1982 | Johnson | 354/126 |

Primary Examiner—Michael L. Gellner
Attorney, Agent, or Firm—Darby & Darby

[57] ABSTRACT

Apparatus for converting a camera for close-up photography, includes a flash hood attachment for the flash unit of the camera for reflectively spreading a beam of light from the flash unit to distribute the light over the field of view for very close subjects. Other attachments provide for reducing the light received by an auto-exposure system of a camera, for blocking a portion of a viewfinder window to correct for parallax problems, and for covering the lens of the camera with a pin hole to convert the camera to a fixed focus camera, all for converting a conventional camera for close-up photography.

21 Claims, 3 Drawing Sheets

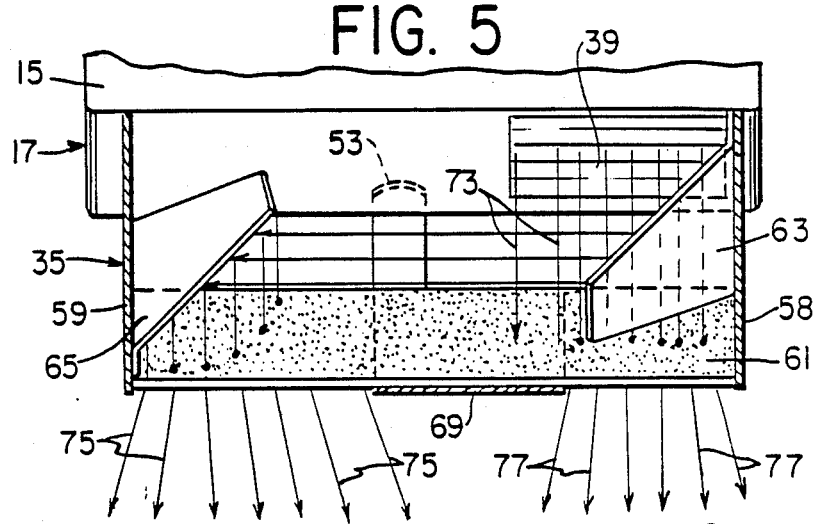
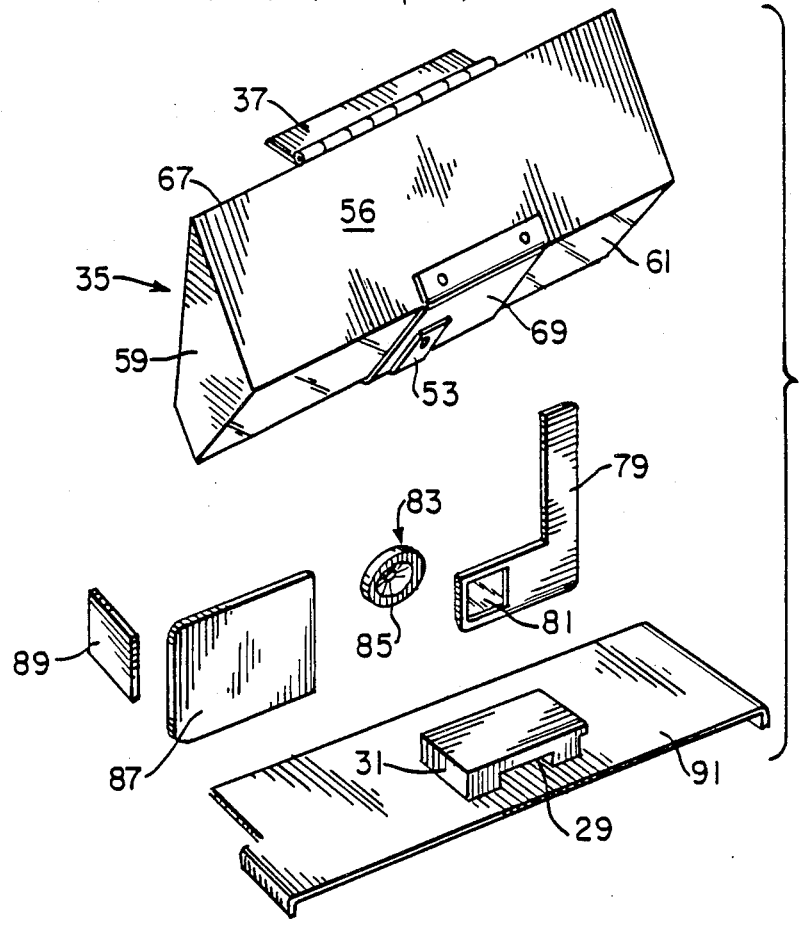

4,755,838

CLOSE-UP CAMERA APPARATUS

FIELD OF THE INVENTION

The field of the present invention relates generally to cameras for close range photography, and more particularly to an attachment for such cameras for spreading the light emitted from the flash unit of the camera to insure proper illumination of a subject being photographed at extremely close range.

BACKGROUND OF THE INVENTION

Close range photography, such as where the subject to be photographed is between 2 and 18 inches from the camera, is presently being used in various diverse applications; for example, such photography finds wide use in various medical, passport, dental, journalistic and law enforcement applications, as well as for pleasure by naturalists and amateur photographers. Close range photography presents problems which are not common to photography in general. For example, positioning of the subject and selection of a proper focal distance for the lens is necessarily a more exacting procedure requiring greater care in close-up photography than in ordinary photographic applications. Prior solutions for such problems are taught in Lester A. Dine et al U.S. Pat. Nos. 3,687,030 (granted Aug. 29, 1972) and 3,836,927 (granted Sept. 17, 1974).

The use of a flash-type light source for close-up photography presents an additional problem in that, as the distance between the camera lens and the subject is varied, the intensity of the light from the camera flash incident on the subject correspondingly varies, since the light incident on a subject at a maximum close range distance (18 inches, for example) from the camera lens is substantially less than if the same subject were positioned at a minimum close range (2 inches, for example) for the same amount of light emanating from the flash source. One solution to this problem has been set forth in the above-mentioned U.S. Pat. No. 3,836,927 which provides means for adjusting the illumination depending upon distance.

Currently, cameras are also available which satisfy this need by sensing the amount of light falling on the subject, and automatically turning off the flash when the predetermined required amount of light has illuminated the subject. However, in cameras in common use, the source of flash is within the same housing as the camera itself, and is necessarily offset to some extent from the lens. This results in a parallax effect that causes the light emitted from the flash in very close-up situations to be non-uniform over the subject in the area of view of the lens.

Accordingly, one object of the present invention is to provide a new and improved close-up camera which utilizes current conventional cameras, modified to overcome these disadvantages and to provide the benefits of uniform illumination over the field of view, to provide proper illumination of the subject at various close range distances from the camera lens to provide proper illumination of the subject.

Still another object of the present invention is to provide such an improved camera in association with simple attachments to facilitate proper focusing and framing of close range subjects.

It is still another object of the present invention to provide such an improved close-up camera by simple and economic modifications of a conventional camera.

SUMMARY OF THE INVENTION

The previously mentioned and other objects of the invention are attained by adding to a common type of camera, apparatus in the form of attachments which include means for spreading the light from a built-in flash unit for illuminating the field of view of very close subjects, such as in the range from 2-18 inches from the camera lens. This is provided in combination with other attachments in the form of locator units, parallax correction units, fixed focus modifiers, and focal length modifiers, that are readily attachable to or removable from the camera unit, to assist in facilitating use of the camera at standard distances without the attachments.

DESCRIPTION OF THE DRAWINGS

In the drawings, wherein like items are designated by the same reference designations:

FIG. 5 shows a section of the flash hood unit viewed along line 5—5 of FIG. 2; and FIG. 6 an exploded view of a set of parts which may be added to a conventional camera to provide other features of the present invention, which parts may be in the form of a kit of attachments to a conventional camera.

DESCRIPTION OF THE PREFERRED EMBODIMENTS

Figure 1:
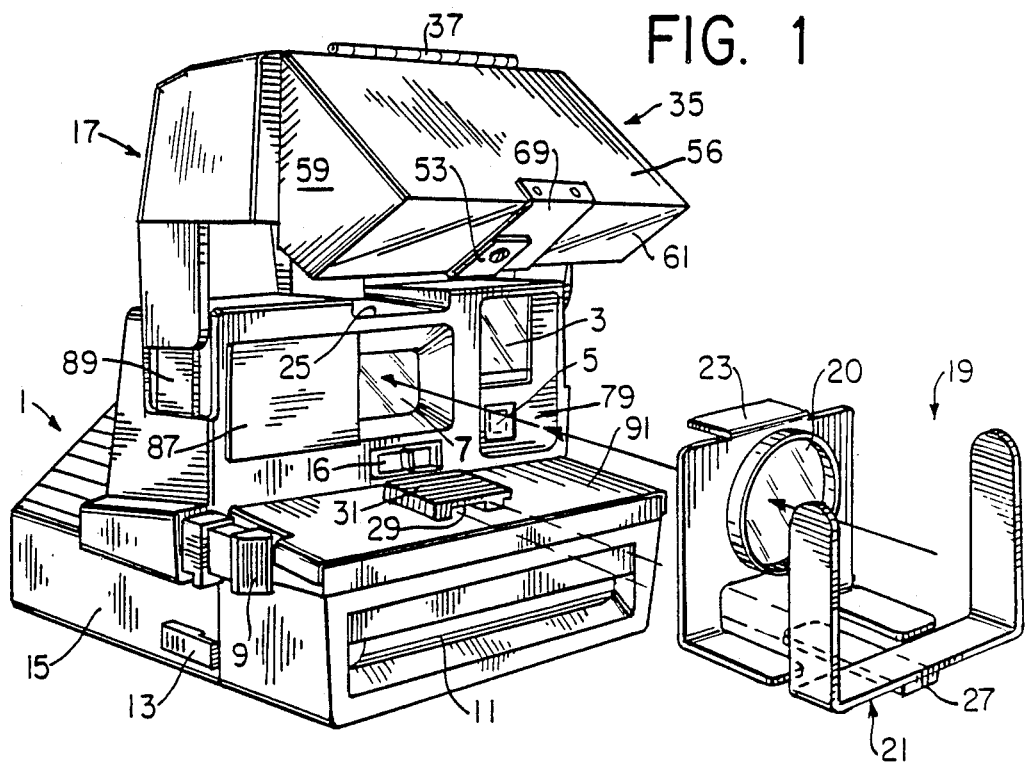
FIG. 1 is a perspective view of an illustrative camera according to the present invention, also showing inventive attachments usable therewith.

With reference to FIG. 1, a camera 1 is shown, which in this example for purposes of illustration is a Polaroid Model No. "SUN 600" (manufactured by the Polaroid Corporation, Cambridge, Mass.) Basically, the conventional configuration of this model camera generally includes a viewfinder window 3, an electronic auto-exposure system including a window 5 for typically receiving light reflected from the subject being photographed, a lens window 7, a shutter trip or release knob 9, a film exit port 11, a sliding latch 13 for permitting access to the film cartridge receptacle (not shown), a main camera body 15, an exposure control 16, and a built-in flash unit or device 17. With further reference to FIG. 1 and to FIG. 2, in ordinary use of the camera, a photographer looks through the viewfinder eyepiece 19 to center the object being photographed within the field of view of the camera, for example, after which the photographer pushes the shutter release knob 9 to release the shutter for activating the camera 1 to take a picture. In this example, upon release of the shutter knob 9, a photograph in the initial stages of development is ejected from the film port 11, which photograph fully develops within a short period of time after ejection from the camera 1.

Figure 2:
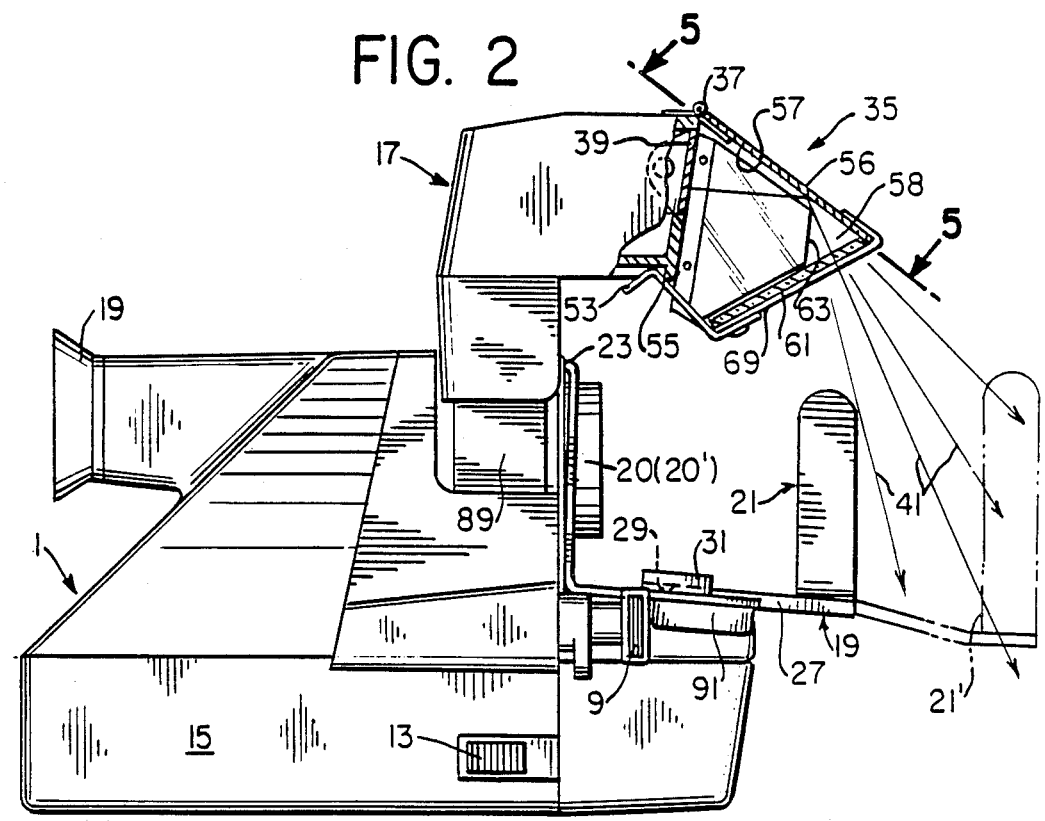
FIG. 2 is a side elevation view of the camera of the invention showing the inventive attachments, and also an alternate embodiment of one attachment of the invention.

In this illustration, one embodiment of the invention includes a combination lens holder and frame attachment 19, the latter including a lens 20 (a plus diopter lens, for example) for modifying the focal length of the lens of the camera 1 to permit close focus for close-up photography. Typically, such close-up photography covers a subject range of 2 to 18 inches from the camera lens 7, depending upon the particular converter lens 21, in this example. The attachment 19 also includes a picture bracketing frame 21 that is U-shaped, as shown. The attachment 21 further includes an upper locating tab 23 for sliding into an indented pathway 25 of the camera 1, and a lower tab 27 for sliding into and frictionally mating with a slotway 29 of a lens mounting plate 31 secured to the top of a film cartridge cover door 33. Accordingly, the lens holder and frame attachment 19 is mounted on the camera 1 by locating the upper tab 23 on the indentation 25 and the lower tab 27 in the slotway 29 and pushing the attachment 19 onto the camera where it locks in place via a spring-biased locking mechanism (not shown) that is included within the lens mounting plate 31. As shown in FIG. 2, the picture bracketing frame 21 may be located closer to or further away from the lens 20, depending upon the focal length provided by the combination of lens 20 and the lens of the camera 1. As shown, for a short focal length, a first picture bracketing frame 21 is closer to the lens; alternatively for a longer focal length, a second picture bracketing frame 21' (shown in phantom) is further from a lens 20', where the lens 20 has a shorter focal length than the lens 20', in this example. In a prototype of the invention, one combination analogous to bracket 21 and lens 20 provided photographing of subjects 2 inches from lens 20; another combination analogous to bracket 21' and lens 20' provided photographing of subjects 4 inches from lens 20', for example.

Figure 3:
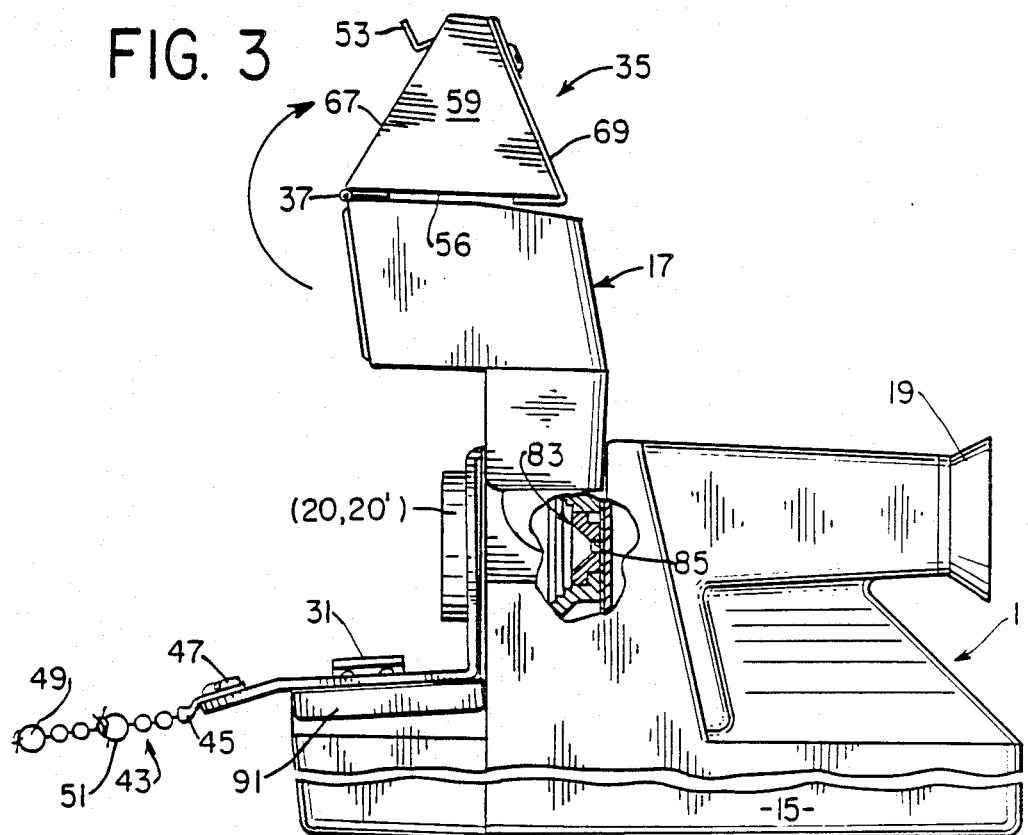
FIG. 3 is an opposite side elevation view of the camera of various embodiments of the invention, including a flash hood device in a retracted position.

In order to overcome the problems of illumination of an object being photographed in close-up photography, one embodiment of the invention includes a flash hood 35 mounted via a hinge plate 37 to the flash unit 17, in this example. The hinge plate 37 permits the flash hood 35 to be swiveled upward, as shown in FIG. 3, for permitting direct illumination from the flash unit 17 of a subject being photographed that is about 18 inches from the lens 20, in this example. For distances from about 2 to 18 inches, in this example, the flash hood 35 is positioned downwardly over the window 39 (see FIG. 4) of the flash unit 17, as shown in FIGS. 1 and 2. As will be explained in greater detail below, for subjects to be photographed from 2 to 18 inches distance from the lens 20, the flash hood 35 redirects or spreads the emission of light from the flash unit 17 for providing improved uniformity of illumination of subjects being photographed at extremely close distances from th lens, in this example 2 to 18 inches. In broad terms, light emitted from the flash unit 17 is reflected within the flash hood 35 and eventually reflected therefrom to illuminate a subject as shown by the arrows 41 in FIG. 2.

With reference to FIG. 3, as previously mentioned, when a subject to be photographed is about 18 inches from the lens 20, in this example, the flash hood 35 is swiveled upward to a retracted position, for providing direct illumination of the subject from the flash unit 17, for insuring adequate illumination of the subject. A chain 43, a ball chain in this example, is attached via an eyelet 45 and screw 47 to the lens holder and frame attachment 19, for permitting accurate location of the subject from the lens 20. For example, 18 inches might be represented by the stretched chain location of the larger ball 49. Also, any other distance could be represented by various ones of the balls on chain 43, such as large ball 51 representing a measured distance of 2 inches from the lens 20 when the chain is stretched horizontally away from the lens 20, for example.

With further reference to FIGS. 2 and 3, the flash hood 35 also includes a latching finger or tab 53, for locking the flash hood 35 in the non-retracted or operational position shown in FIG. 2 over the flash unit 17. As shown in FIG. 2, the locking tab 53 "snaps" over an edge projecting portion 55 of the flash unit 17. To place the flash hood 35 in its retracted position, the locking tab 53 is pulled down to unlatch the flash hood and then the hood is rotated upward via the hinge of the hinge plate 37 to the retracted position shown in FIG. 3, as previously mentioned.

With reference to FIGS. 2, and 4 through 6, the flash hood 35 includes: a top surface 56 sloping downwardly away from the front surface of the flash device 17, with the inside face 57 of the top surface 56 being light-reflective; a right side 57; a left side 59; a light diffuser 61 covering the front portion; first and second interior light reflectors 63 and and 65, respectively; an open back 67 open to and extending substantially beyond the light emitting window 39 of the flash unit or device 17; and a light-blocking mask 69 mounted across a centralmost portion of the diffuser 61 for blocking the emission of light from that area of the diffuser 61 outward to a subject, for preventing bright spots in illuminating the subject being photographed at close range. A prototype flash hood 35 was fabricated from Alzak material (registered trademark of American Aluminum Co.). The interior surfaces of the material, including the reflectors 63 and 65 were polished for providing necessary light-reflective surfaces.

Figure 4:
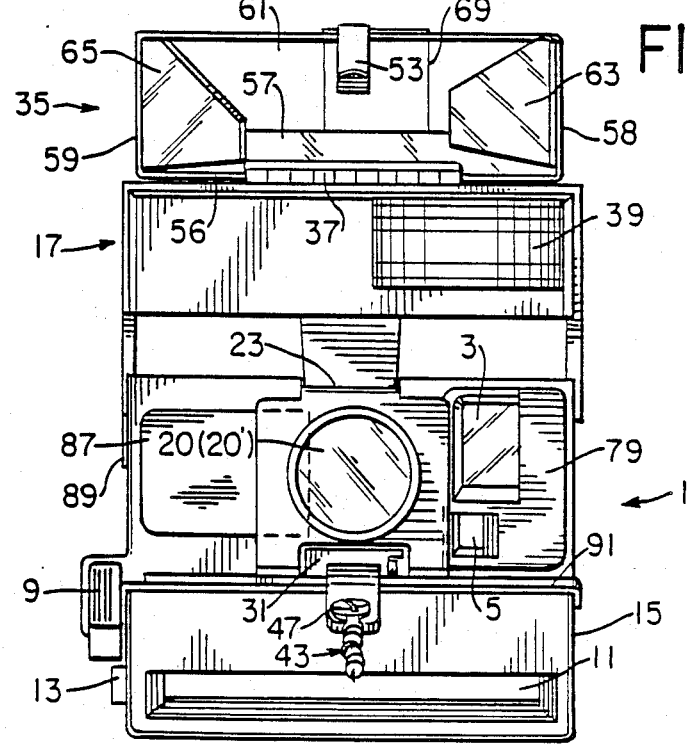
FIG. 4 shows a front elevation view of the flash hood of the present invention in the position of FIG. 3.

As shown in FIGS. 4 and 5, the first and second light reflector tabs or surfaces 63, 65, respectively, located on the right and left sides of the flash hood 35 relative to viewing the flash hood 35 by facing the front of the diffuser 61, each includes a truncated triangular-like configuration, and each is mounted along one edge to the rearmost edges of the associated right and left sides 58, 59, respectively, with each reflector 63, 65 being bent away from its associated right or left side, respectively, at a predetermined angle for insuring the desired redistribution of light from the light emitting window 39 of the flash unit 17. In this example, each of the reflectors 63 and 65 is bent 45 degrees away from its associated right or left side 58, 59, respectively, of the flash hood 35. Also, the interior surface 71 (see FIG. 4) of the top 56 of flash hood 35 is polished to provide another reflective surface.

With reference to FIG. 5, in general terms, when the flash unit 17 is operated, light is emitted from the flash window 39 in a relatively narrow beam represented by the arrows 73. In this example, the light beam emitted from flash unit 17 does not have any appreciable spreading for about 18 inches from the lens of the camera 1. For this reason, subjects being photographed closer to the lens than 18 inches are not properly illuminated by light from the flash unit 17. To overcome this, with the flash hood 35 positioned over the light window 39, a portion of the light transmitted from the light window 39 is intercepted and reflected by the righthand reflector 63 to the lefthand reflector 65. The reflector 65 then redirects the light rays its receives from the reflector 63, outwardly through the diffuser 61, as represented by the arrows 75. A portion of the light from the window 39 not reflected by reflector 63 to reflector 65, is transmitted directly outward through the diffuser 61 to the subject being photographed, as represented by the arrows 77. Also, a portion of the light transmitted from the window 39 is reflected about the interior reflective surfaces of the flash hood 63 and outward through the diffuser 61. The mask 69 prevents light from being transmitted through the diffuser 61 about the centralmost portion thereof, as previously explained, for eliminating bright spots on the subject. In this manner, light transmitted from window 39 is redirected or spread by the light hood 35 for insuring proper illumination of subjects being photographed at extremely close ranges, such as within 2 to 18 inches from the lens, in this example. Also, the diffuser 61 serves to diffuse light emitted from hood 35, when tilted down to a position over window 39 of flash unit 17, as previously described. Also, the angle of flash hood 35 relative to the location of the subject being photographed, is adjusted to insure proper illumination of subjects located between 2 inches and 18 inches from the lens 7, in this example.

Other features of the invention, included in the previously mentioned kit, include a mask 79 (see FIG. 6) mounted over a portion of the viewfinder window 3, as shown in FIG. 1. The mask 79 blocks the viewfinder window in a predetermined area for insuring that a user of the close-up camera will not encounter parallax problems in viewing subjects through the viewfinder for centering close-up photography.

Also, as shown in FIG. 6, the kit further includes a washer or disk 83 having a centrally located pin hole 85. The washer 83 is mounted behind the lens 7 of the camera 1 for converting the camera 1 to a universal focus camera, for close-up photography. A lower portion of the mask 79 also includes a 3X density filter 81, in this example, for covering the window 5 of the autoexposure system of the camera 1. The filter 81 reduces the intensity of light delivered to a light detector (not shown) included in the autoexposure system of camera 1, for causing the system to properly expose the film by increasing the light output from flash unit 17, in this example. A masking insert 87, for example, is shown in FIG. 6, and in FIG. 1 as mounted on the camera 1. The flash unit 17 of the illustrative camera 1 as supplied by Polaroid Corporation, is made to swivel downward to a "closed position" for covering lens 7, and windows 3 and 5, when the camera 1 is not in use. A stop 89 is attached to the camera 1 for insuring that the flash unit 17 cannot be swiveled downward, thereby preventing damage to the flash hood 35. Lastly, the kit includes a mounting bracket 91 to which is secured the lens mounting plate 31. The mounting bracket 91 is secured to the top of the film cartridge door 33, as shown in FIG. 1.

The present description of the various embodiments of the invention is meant to be illustrative and not limiting, whereby other embodiments of the invention are deemed to be within the scope and spirit of the present invention as claimed below. For example, the various embodiments of the present invention are applicable for use, with minor modification, in modifying most conventional cameras for close-up photography.

What is claimed is:

1. In apparatus for adapting to close-up use a camera including a lens and a flash device, said apparatus including close-up lens means positionable over said camera lens for modifying the focal distance thereof to a predetermined position, the improvement comprising:
    flash hood means mounted over said flash device in a first position, for spreading and redirecting a portion of the light beam emitted from said flash device to obtain proper illumination of the subject being photographed, said flash hood means including:
        a back region open to and extending substantially beyond a light emitting window located on a front surface of said flash device;
        a top surface sloping downwardly away from the front surface of said flash device, the inside face of said top surface being light reflective;
        diffuser means covering a front portion for diffusing light passing therethrough, the front portion sloping inwardly and downwardly away from a top edge of said top surface;
        a right side and a left side; and
        first and second light reflector means located at said right and left sides, respectively, whereby a first portion of the light emitted from said light emitting window travels directly through said flash hood means and out said diffuser means, a second portion of the light is reflected from an inner reflective surface of said first reflector means to an inner reflective surface of said second reflector means, the latter reflecting the light it receives to and through said diffuser means.

2. The improvement of claim 1, further including:
    mounting means for mounting said flash hood means on said flash device, said mounting means including means for selectively positioning said flash hood means in either said first position or in a second position on said flash device, the second position being for permitting normal emission of light from said flash device for subjects located beyond another predetermined position from said lens, at which position no redirection of light from said flash device is required for proper illumination of said subject 3. The improvement of claim 2, wherein said selective positioning means includes hinge means rigidly connected between a top forwardmost edge of said flash device and a top rearwardmost edge of said flash hood, and latching means for locking said flash hood in said first position, said latching means being operable for unlocking said flash hood to permit the latter to be swung upward via said hinge means to said second position where said flash hood means has its top surface juxtaposed to the top of said flash device.

4. The improvement of claim 1, wherein each of each of said first and second reflector means includes a truncated triangular like reflector rigidly mounted along one edge to the rearmost edge of a respective one of said right and left sides, and each being bent away from its respective said right or left side, each being at a predetermined angle for ensuring the desired redistribution of light from said light emitting window to illuminate said subject.

5. The improvement of claim 4, wherein each of said first and second reflectors is each bent 45 degrees away from said right and left side, respectively.

6. The improvement of claim 4, wherein each of said first and second reflectors consists of a polished metal material.

7. The improvement of claim 4, further including light blocking means mounted at a centralmost portion of said diffuser means for preventing bright spots in illuminating said subject.

8. The improvement of claim 4, further including a reflective surface on the inside face of the top of said flash hood means.

9. The improvement of claim 1, wherein said camera further includes an auto-exposure system having a light receiving window at the front of said camera, for receiving light reflected from the subject for delivery to a light detector, wherein the improvement further comprises filter means covering said window for reducing the intensity of light delivered to said light detector by a predetermined amount, for causing said auto-exposure system to correct the exposure of the film.

10. The improvement of claim 9, wherein said filter means consists of a 3X density filter.

11. The improvement of claim 1, wherein said camera further includes a viewfinder system including a viewfinder window at the front of the camera, and wherein said improvement further comprises masking means for blocking a portion of said viewfinder window to substantially eliminate parallax problems in using said viewfinder to center subjects for close-up photography.

12. The improvement of claim 1, further including pin hole means mounted behind the lens of said camera for configuring the latter as a fixed focus camera.

13. A flash hood for redistributing a beam of light from a flash unit of a camera configured for close-up photography comprising:
mounting means for mounting said flash hood on said flash unit;
said flash hood including first and second light reflector tabs located a distance from one another at right and left sides of said flash hood, respectively, whereby a first portion of the light emitted from a relatively narrow light emitting window of said flash unit travels directly through said flash hood means, a second portion of the light is reflected from an inner reflective surface of said first reflector means to an inner reflective surface of said second reflector means, the latter reflecting the light it receives to and out of said flash hood, thereby providing a beam of light substantially wider and broader than that from said flash unit alone.

14. The flash hood of claim 13, wherein each of said first and second reflector tabs consists of a truncated triangular-like member rigidly mounted along one edge to the rearmost edges of a respective one of said right and left sides, and each being bent away from its said respective right or left side, each being at a determined angle for ensuring the desired redistribution or spread of light from said light emitting window to illuminate said subject.

15. The flash hood of claim 14, wherein each of said first and second reflector tabs is bent 45 degrees away from its respective said right or left side of said flash hood.

16. The flash hood of claim 13, wherein each of said first and second reflector tabs consists of polished metal material.

17. The flash hood of claim 13, further including diffuser means across the front of said flash hood for diffusing light transmitted therefrom.

18. The flash hood of claim 17, further including light-blocking means mounted at a centralmost portion of said diffuser means for preventing bright spots in illuminating said subject.

19. The flash hood of claim 13, further including a reflective surface on the inside face of the top of said flash hood means.

20. In apparatus for adapting to close-up use a camera including a lens, an auto-exposure system having a light receiving window at the front of said camera, for receiving light reflected from the subject for delivery to a light detector, a viewfinder system including a viewfinder window at the front of the camera, and a flash device, said apparatus including close-up lens means positionable over said camera lens for modifying the focal distance thereof to a predetermined position, the improvement comprising:
flash hood means mounted over said flash device in a first position, for spreading and redirecting a portion of the light beam emitted from said flash device to obtain proper illumination of the subject being photographed, said flash hood means including:
a back region open to and extending substantially beyond a light emitting window located on a front surface of said flash device;
a top surface sloping downwardly away from the front surface of said flash device, the inside face of said top surface being light reflective;
diffuser means covering a front portion for diffusing light passing therethrough, the front portion sloping inwardly and downwardly away from a top edge of said top surface;
a right side and a left side; and
first and second light reflector means located at said right and left sides, respectively, whereby a first portion of the light emitted from said light emitting window travels directly through said flash hood means and out said diffuser means, a second portion of the light is reflected from an inner reflective surface of said first reflector means to an inner reflective surface of said second reflector means, the latter reflecting the light it receives to and through said diffuser means;
filter means covering said window for reducing the intensity of light delivered to said light detector by a predetermined amount, for causing said auto-exposure system to correct the exposure of the film;
masking means for blocking a portion of said viewfinder window to substantially eliminate parallax problems in using said viewfinder to center subjects for close-up photography; and
pin hole means mounted behind the lens of said camera for configuring the latter as a fixed focus camera.

21. The improvement of claim 20, wherein said filter means consists of a 3X density filter.

* * * * *